United States Patent
Shavell et al.

(10) Patent No.: US 10,004,986 B1
(45) Date of Patent: Jun. 26, 2018

(54) MONITORING VIDEO GAME ACTIVITY BY WIRELESS SCANNING

(71) Applicant: Symantec Corporation, Mountain View, CA (US)

(72) Inventors: Michael Shavell, Merrimack, NH (US); Kevin Jiang, San Mateo, CA (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 12 days.

(21) Appl. No.: 15/159,685

(22) Filed: May 19, 2016

(51) Int. Cl.
  *G06F 17/00* (2006.01)
  *A63F 13/31* (2014.01)
  *H04W 24/08* (2009.01)
  *H04L 12/26* (2006.01)

(52) U.S. Cl.
  CPC ............ *A63F 13/31* (2014.09); *H04L 43/045* (2013.01); *H04L 43/067* (2013.01); *H04W 24/08* (2013.01)

(58) Field of Classification Search
  None
  See application file for complete search history.

(56) References Cited

U.S. PATENT DOCUMENTS

| | | | | |
|---|---|---|---|---|
| 9,364,743 | B2 * | 6/2016 | Miura | A63F 13/00 |
| 2010/0056280 | A1 * | 3/2010 | Langan | A63F 13/12 463/42 |
| 2013/0290896 | A1 * | 10/2013 | Huang | G06F 17/24 715/780 |
| 2014/0298194 | A1 * | 10/2014 | Prasad | G06F 17/30867 715/745 |

* cited by examiner

*Primary Examiner* — Ronald Laneau
(74) *Attorney, Agent, or Firm* — Patterson + Sheridan, LLP (57) ABSTRACT

Techniques are disclosed for monitoring and evaluating video game activity by scanning for communications between a gaming console and peripherals that wirelessly communicate with the gaming console. An activity tracker receives wireless communications sent between the gaming console and a peripheral. The activity tracker generates one or more usage metrics describing the wireless communications. The activity tracker evaluates the network data based on or more specified rules. Upon determining that the usage metrics trigger a specified rule, the activity tracker generates a notification to describing those usage metrics.

20 Claims, 6 Drawing Sheets

MONITORING VIDEO GAME ACTIVITY BY WIRELESS SCANNING

BACKGROUND

Field

Embodiments of the present disclosure generally relate to computer security, and more specifically, to monitoring video game activity by scanning wireless communications by a gaming console device.

Description of the Related Art

Modern households are immersed in technology. For example, it is not uncommon for a family to own various networked devices in their home, including computers and phones that can access the Internet. Further, the family might own one or more gaming consoles that are also network accessible, allowing users of the gaming consoles to engage with other players online. Further still, recently even many household appliances are starting to become networked under the Internet of Things paradigm.

Because these devices are often networked, maintaining security of the devices is of importance. Some home networking systems include network security software such as antivirus applications, network activity monitoring applications, and the like. Such network security software can monitor, usually through some agent executing on the device, activity occurring within a home network and detect instances of suspicious activity. However, as newer devices become available, some network security software may be deficient in adequately protecting those devices and, consequently, the home network.

One particular deficiency is in modern gaming console devices. For example, a family may want to restrict a child's video game activity, e.g., by limiting the amount of time that the child can play video games, restricting hours during which the child can play, prohibiting the child from playing video games altogether, etc. Although modern gaming consoles generally include parental controls, these controls are often inadequate for tracking gaming activity by a user. In addition, because gaming consoles typically do not allow applications to be installed on the device itself (other than those applications authorized by the console manufacturer), network security software may have difficulty tracking activity from gaming console devices. A current approach to detecting network security software is by monitoring Wi-Fi activity by the gaming console device. However, this can be easily circumvented by disabling Wi-Fi (or network connections in general) within the gaming console device. That is, even if disconnected, a user can typically continue to play games on the console. Therefore, current approaches are somewhat limited.

SUMMARY

One embodiment presented herein describes a method. This method generally includes observing one or more wireless communications sent between a gaming console and at least a first peripheral. One or more usage metrics describing the wireless communications is generated. The wireless communications are evaluated based on one or more specified rules. Upon determining that the usage metrics trigger at least one of the specified rules, a notification describing the usage metrics triggering the specified rules is generated.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be incorporated in other embodiments without further recitation.

DETAILED DESCRIPTION

Embodiments presented herein disclose techniques to monitor video game activity in a network, such as a home network. In one embodiment, a parental monitoring tool executing in a computer tracks activity in the home network, e.g., via a router or other network device. The parental monitoring tool may detect suspicious activity occurring in devices used in the home network (e.g., network attacks, malware transmission, etc.). In response to detecting suspicious activity, the parental monitoring tool can log and alert a user (e.g., a parent) within the network.

In one embodiment, the parental monitoring tool provides a video game (VG) activity tracker monitors wireless activity in gaming console devices in proximity to the network device. For example, the (VG) activity tracker may detect Wi-Fi traffic originating from a given gaming console device and continue to track that the console device is being used.

However, in some cases, a user can circumvent such detection by disabling Wi-Fi features on the device itself. In doing so, the gaming console device may cease sending outgoing wireless data but continue to let the user play games on the console. This poses a challenge for the VG activity tracker, as the parental monitoring tool is typically unable to install an agent on the console device unless authorized by the console manufacturer to do so.

To address this issue, in one embodiment, the VG activity tracker may detect, via the network device, communications between a gaming console device and peripheral devices that wirelessly connect with the console. Generally, peripheral devices for the gaming console, such as game controllers, keyboards, cameras, and the like, operate wirelessly. For example, game controllers that come standard to a given gaming console are configured such that they do not require, or even have the ability to establish, wired communications with the gaming console. And while modern gaming console devices include USB ports that may directly attach the game controller to the device, such USB ports typically serve solely as a charging function for the controller. Therefore, when a gaming console device is powered on, the gaming console device will wirelessly communicate with peripheral devices (connected to the console).

In one embodiment, the VG activity tracker may detect wireless data in the network and determine, based on libraries of fingerprint data, whether the wireless data corresponds to communications between a given gaming device and one or more peripheral devices. If so, the VG activity tracker may begin to collect metrics associated with the communications between the console and the peripheral devices. For example, the VG activity tracker may measure an amount of time that the activity occurs, timestamp the activity, how many peripheral devices were used during a given period, and the like.

Further, the VG activity tracker may report such metrics via the parental monitoring tool. In addition, the VG activity tracker may evaluate the metrics against a set of rules for monitoring usage of the gaming console device. For example, rules may specify certain time-related usage limits, e.g., on the amount of time that should be spent as on the periods during which the gaming console can be used, etc. The rules may also specify other limits, e.g., which gaming console devices can be used, and the like. When any of these rules are triggered, the VG activity tracker may generate an alert notification to present via a user interface of the parental monitoring tool for a user to review and determine whether to take any action.

Advantageously, scanning communications between a gaming console device and a peripheral device allows network security applications, such as the VG activity tracker, to monitor gaming console device usage even when the gaming console device does not have an active wireless connection established with the network device. Further, this approach does not require that an agent be installed on the gaming console device. Rather, the VG activity tracker identifies, based on libraries of fingerprint data, wireless activity that corresponds to communication data sent between the gaming console device and peripheral devices. Therefore, rather than install an agent which might require a level of familiarity with application programming interface (APIs) of the gaming console (in addition to authorization by the console manufacture), the VG activity tracker may instead track the data based on identifiable fingerprint data.

Note, the following uses a parental monitoring tool that scans as a reference example of an application that detects video game usage activity. However, one of ordinary skill in the art will recognize that embodiments presented herein may be adapted to a variety of systems. For example, embodiments may be adapted to a lifestyle monitoring application that tracks and evaluates video gaming console usage by a user. Such an application may generate reports and recommendations for the user based on the activity (e.g., suggesting that the user restrict playing time, use motion-sensing controllers to encourage the user to move while playing a game, etc.).

Figure 1:
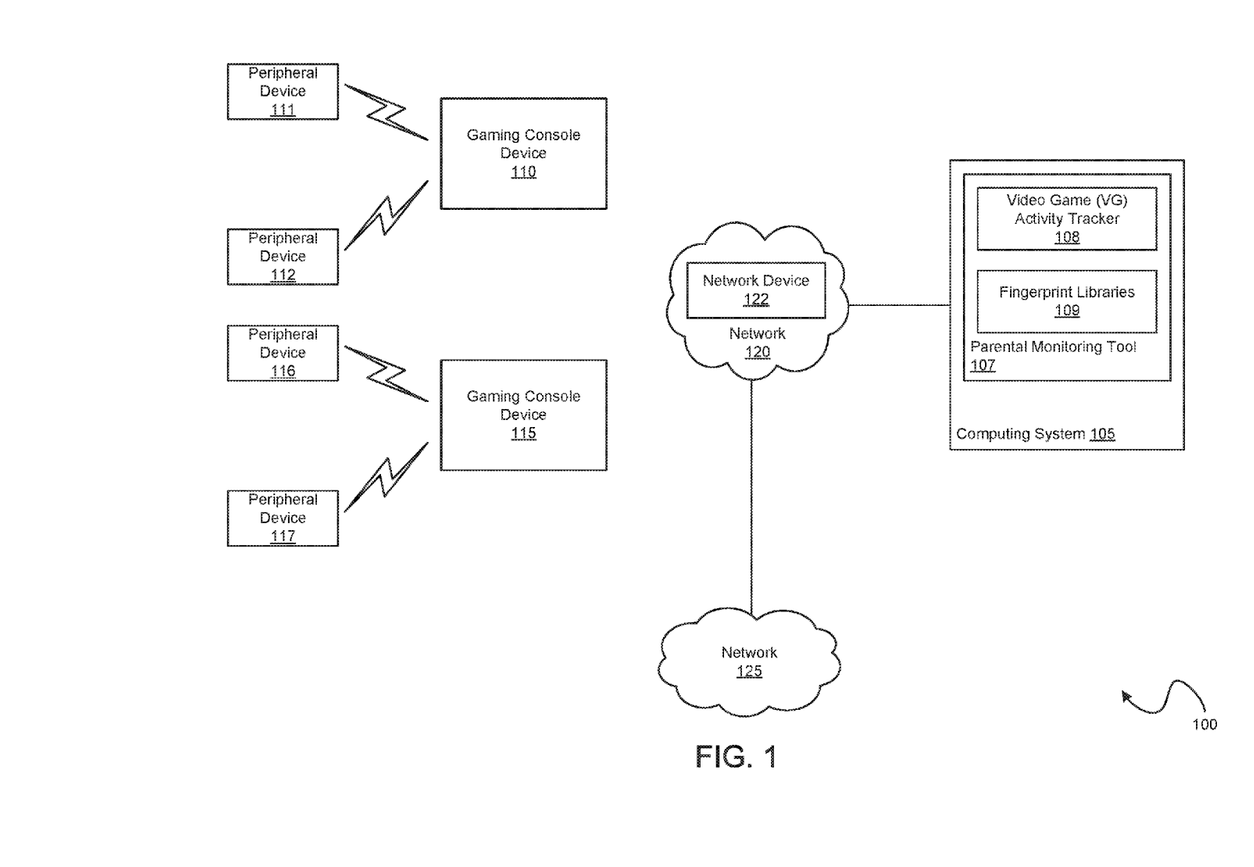
FIG. 1 illustrates an example computing environment, according to one embodiment.

FIG. 1 illustrates an example computing environment 100, according to one embodiment. As shown, computing environment 100 includes, without limitation, a computing system 105, gaming console device 110, gaming console device 115, a network 120, and a network 125. Computing environment 100 also includes peripheral devices 111, 112, 116, and 117. The computer system 105 may be interconnected with the network 120. Further, the gaming console devices 110 and 115 may optionally be wirelessly connected to the network 120, e.g. via a Wi-Fi connection. In one embodiment, the network 120 represents a home network connecting a variety of devices in a household. The network 120 may include a variety of network devices, such as network device 122, which, in one embodiment, represents a router. The network 120 itself may be connected to the network 125. In one embodiment, network 125 represents the Internet.

In one embodiment, the computing system 105 includes a parental monitoring tool 107. The parental monitoring tool 107 provides security within the home network, e.g., monitoring network activity, performing antivirus functions, restricting access to specified websites, and the like. Further, the parental monitoring tool 107 receives network data observed by the network device 122 and may evaluate the data relative to pre-defined policies to identify various activities in the network, including suspicious activity that may compromise the home network. The network activity may originate from a variety of devices in the network, including desktop computers (e.g., the computing system 105), laptop computers, mobile phones, and Internet of Things devices. To facilitate monitoring, the parental monitoring tool 107 may configure some devices with an agent application. Doing so allows the parental monitoring tool 107 to more efficiently scan these devices for suspicious activity and files.

In one embodiment, gaming console devices 110 and 115 represent modern gaming consoles widely used in households. The gaming console devices 110 and 115 include various features for a user, including allowing the user to play video games, use video-streaming applications, access the Internet, and the like. Further, each of the gaming console devices 110 and 115 may be wirelessly connected with various peripheral devices, such as game controllers, headsets, cameras, keyboards, and the like. For example, FIG. 1 depicts the gaming console device 110 wirelessly connected with peripheral devices 111 and 112 (similarly, FIG. 1 also depicts the gaming console device 115 connected with peripheral devices 116 and 117). The peripheral devices may use various protocols to communicate with the corresponding gaming console device. For example, the peripheral devices 111 and peripheral device 112 may communicate with the gaming console device 110 via a Bluetooth connection, while the peripheral devices 116 and 117 may communicate with the gaming console device 115 via some proprietary protocol.

As stated above, a user can disable Wi-Fi connectivity in either of the gaming console devices 110 and 115, which presents a challenge for the parental monitoring tool 107 in determining whether the gaming console system is currently being used. To address this issue, in one embodiment, the parental monitoring tool 107 provides a video game (VG) activity tracker 108 and fingerprint libraries 109. As further described below, the VG activity tracker monitors and evaluates usage activity in the gaming console devices 110 and 115. To do so, the VG activity tracker 108 may receive network activity data and determine whether the activity data corresponds to communications between a peripheral device and the gaming console system. For example, the VG activity tracker 108 may do so based on fingerprint libraries 109, which is a store of data patterns known to correspond with communications with a given gaming console device. Once determined, the VG activity tracker 108 may generate reports and alerts notifying a user of the evaluated activity.

Figure 2:
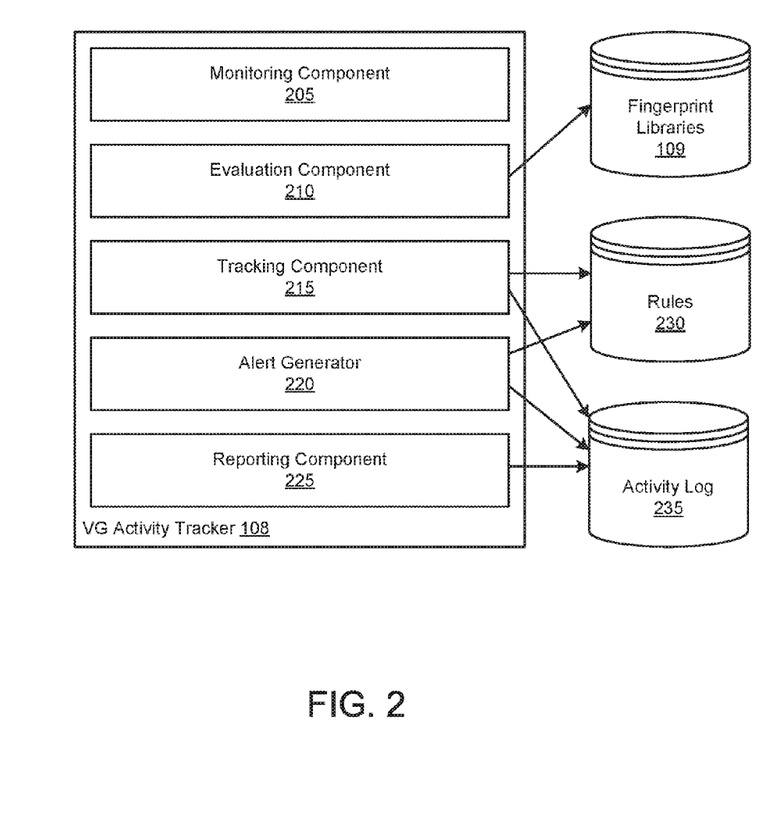
FIG. 2 further illustrates the video game (VG) activity tracker described relative to FIG. 1, according to one embodiment.

FIG. 2 further illustrates the VG activity tracker 108, according to one embodiment. As shown, the VG activity tracker includes a monitoring component 205, an evaluation component 210, a tracking component 215, an alert generator 220, and a reporting component 225. FIG. 2 also depicts the VG activity tracker 108 interacting with the fingerprint libraries 109, a configuration of one or more rules 230, and an activity log.

In one embodiment, the monitoring component 205 receives network activity data (e.g., network packets, frames, etc.) from the network device 122. The monitoring component 205 can receive the network activity data in a continuous manner or in specified intervals. Further, the monitoring component 205 may format the network activity data to be analyzed by the evaluation component 210.

In one embodiment, the evaluation component 210 compares the input network activity data with the fingerprint libraries 109. As stated, the fingerprint libraries 109 provide data patterns relating to a known communication protocol. For example, fingerprint libraries 109 may allow the evaluation component 210 to identify a particular set of data packets to correspond to a proprietary protocol used by the peripheral devices 116 and 117. By identifying a protocol, the evaluation component 210 may then determine, based on the identified protocol, a type of gaming console device, type of controller used, and metadata that may be provided in the packet headers. The evaluation component 210 may forward such data to the tracking component 215.

In one embodiment, the tracking component 215 may collect usage metrics relating to the video game activity. For example, the tracking component 215 may determine, based on the network activity data and metadata, whether an amount of time spent by a user from the time that the monitoring component 205 begins to receive network activity data corresponding to video game activity and to the time that the monitoring component 205 no longer receives the corresponding video game activity (after a specified time of inactivity). In addition, the tracking component 215 may evaluate pre-defined rules 230 to determine whether to alert or notify a user of the video game usage. For instance, rules 230 may specify a certain threshold of time (e.g., configurable by the user) of continuous video game activity. The threshold being exceeded would trigger the rule, resulting in an alert notification being generated. Other examples of rules may include time windows during which to generate an alert (e.g., after 12:00 AM, between 9:00 AM-5:00 PM, etc.).

In one embodiment, the alert generator 220 creates an alert notification to report to the parental monitoring tool 107 in the event that the evaluated metrics triggers one of the rules 230. For example, the alert generator 220 may include, in the alert, gaming console type, peripheral type, duration information, timestamps, and the like. In one embodiment, the reporting component 225 may log observed metrics and activity data to the activity log 235. The parental monitoring tool 107 may present generated alerts and the activity log 235 to a user (e.g., a parent) to review, e.g., via a user interface.

Figure 3:
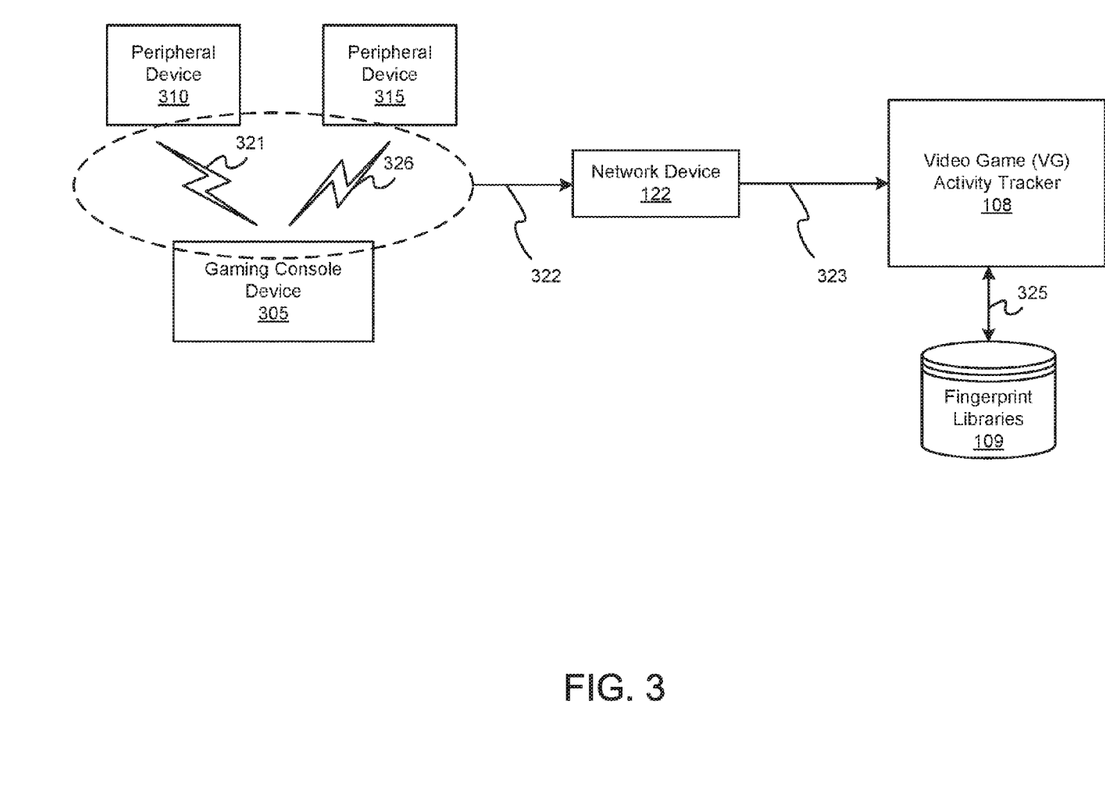
FIG. 3 illustrates an example flow of detecting video game activity by wireless scanning, according to one embodiment.

FIG. 3 illustrates an example flow of detecting video game activity from a gaming console device 305. As shown, the gaming console device 305 is connected with peripheral devices 310 and 315. In this example, peripheral devices 310 and 315 represent game controllers wirelessly connected to the gaming console device 305 via a protocol that is proprietary to the gaming console device 305.

In this example, assume that a user powers on the gaming console device 305. In doing so, the gaming console device 305 might attempt to connect to any peripheral devices in proximity that may also be powered on. Illustratively, at 321, the gaming console device 305 connects with the peripheral devices 310 and 315 (at 321 and 326, respectively). The gaming console device 305 may continuously and separately send data back and forth with the peripheral devices 310 and 315.

At 322, the network device 122 detects wireless activity representing the peripheral device 310 communicating with the gaming console device 305. Similarly, the network device 122 detects wireless activity representing the peripheral device 315 communicating with the console device 305. As stated, the wireless activity may be data packets sent back and forth between the game console device 305 and the peripheral devices. Once detected, the network device 122 may sample some of the wireless activity between each peripheral device and forward the wireless activity to the VG activity tracker 108 (at 323).

At 325, the VG activity tracker 108 receives the wireless activity data from the network device 122. The VG activity tracker 108 evaluates the wireless activity data against the fingerprint libraries 109 (at 325). Based on the evaluation, the VG activity tracker 108 may identify two distinct devices communicating with the gaming console device 305. Note, the VG activity tracker 108 may be configured to evaluate activity originating from multiple peripheral devices as distinct streams of activity, or in the totality.

For example, assume that a rule 230 is triggered when a user (e.g., a child) plays video games on the gaming console 305 for over two hours. To circumvent this rule, the child may attempt to turn off one controller (e.g., peripheral device 310) and power on another controller (e.g., peripheral device 315) within the two hour time window. In such a case, another user (e.g., a parent) can configure the VG activity tracker 108 to evaluate video game activity in the totality, e.g., by specifying an additional rule 230 to address this case.

Figure 4:
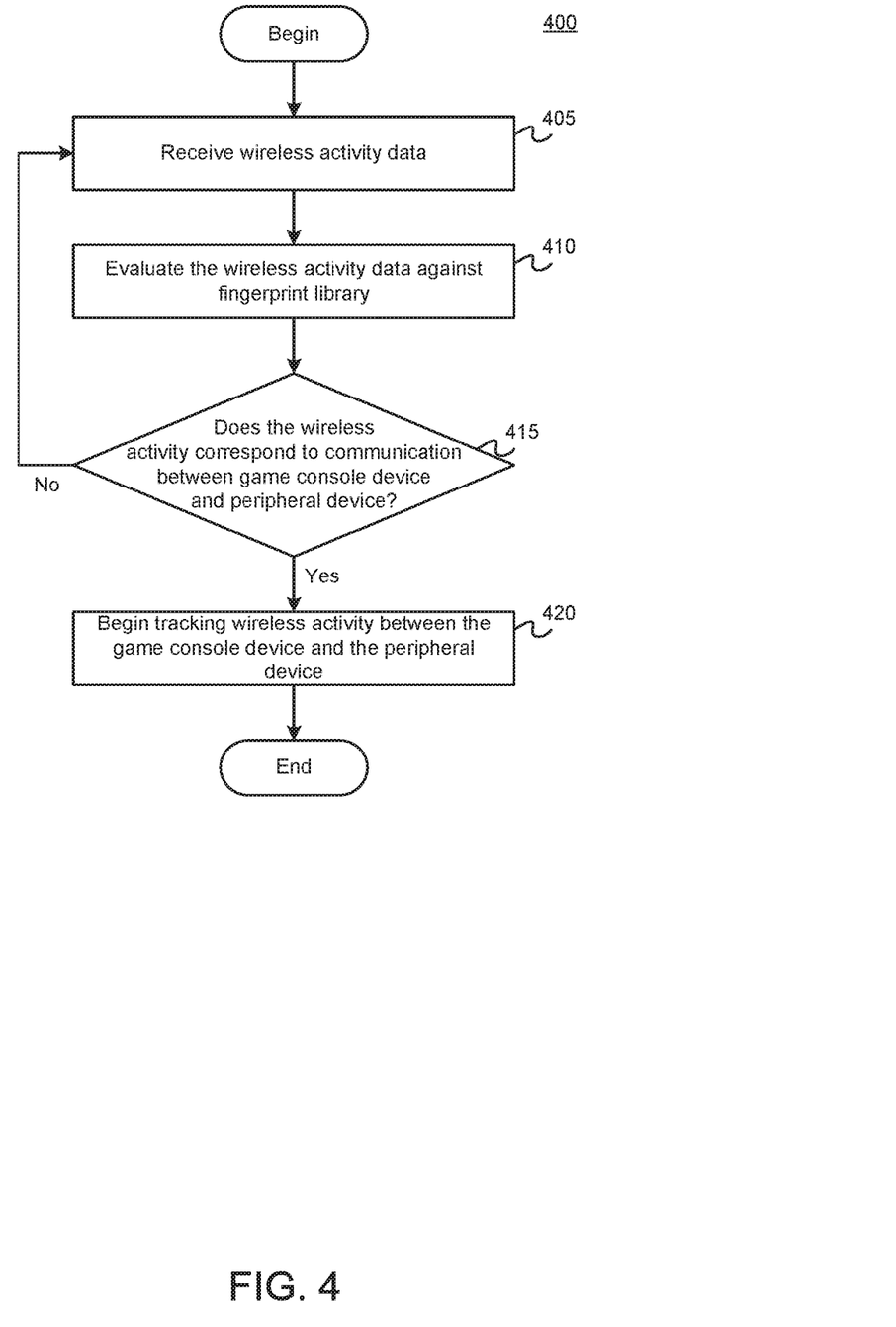
FIG. 4 illustrates a method for monitoring video game activity in a network, according to one embodiment.

FIG. 4 illustrates a method 400 monitoring video game activity in a network, according to one embodiment. As shown, the method 400 begins at step 405, where the monitoring component 205 receives wireless network activity from the network device 122. For example, at this point, a user may power on a gaming console device within proximity to the network device 122. The gaming console device may then establish a connection with a peripheral device, e.g., a game controller, using some wireless communication protocol. The network device 122 may detect such communication and forward the communication to the monitoring component 205.

At step 410, the evaluation component 210 compares the wireless activity data against the fingerprint libraries 109. As stated, the fingerprint libraries 109 provides data pattern definitions corresponding to known communication protocols. At step 415, the evaluation component 210 determines, based on the fingerprint libraries 109, whether the wireless activity data corresponds to communications between a game console device and a peripheral device.

At step 420, the tracking component 215 begins tracking wireless activity between the game console device and the peripheral device. For example, the tracking component 215 may collect several metrics based on the activity as the user continues to use the gaming console device. For example, the tracking component 215 can measure an amount of time spent, timestamps, peripheral device type, and the like.

Figure 5:
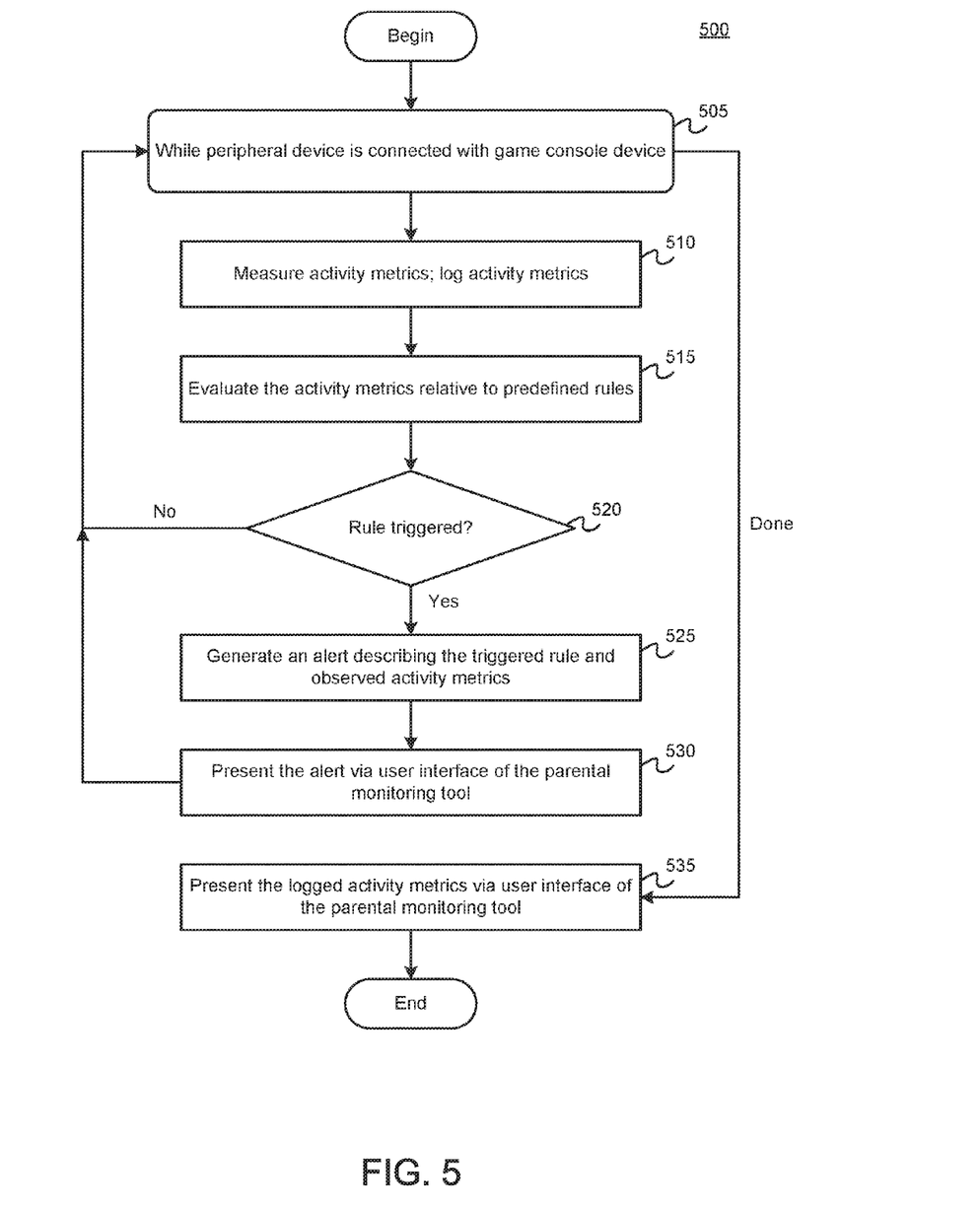
FIG. 5 illustrates a method for reporting video game activity detected in a network, according to one embodiment.

FIG. 5 illustrates a method 500 for reporting video game activity detected in a network, according to one embodiment. As shown, method 500 begins at step 505, where the method enters a loop while a given peripheral device is connected with a game console device. The loop includes steps 510 through steps 530.

At step 510, the tracking component 215 measures activity metrics and logs the activity metrics (as activity log 235). For example, the tracking component 215 might determine, based on the activity data, that the user is playing video games at 2:00 AM. At step 515, the tracking component 215 evaluates the activity metrics against specified rules 230. In this example, assume that one rule 230 specifies to present an alert notification to the parental monitoring tool 107 if video game activity occurs between 10:00 PM to 7:00 PM.

At step 520, the tracking component 215 determines whether one of the rules 230 is triggered. If not, then the method 500 goes back to step 505 (until done). In the continuing example, video game activity occurring at 2:00 AM triggers a rule 230. in such a case, at step 525, the alert generator 220 creates an alert describing the triggered rule and logged activity metrics to associate with the alert. In turn, the reporting component 225 may send the alert to the parental monitoring tool. At step 530, the parental monitoring tool presents the alert via a user interface.

At step 535, after the gaming console device and the peripheral device no longer communicate with one another, e.g., if the network device 122 no longer detects wireless activity occurring between the devices, the parental monitoring tool 107 may publish the logged activity such that a user may retrieve and review the activity log 235.

Figure 6:
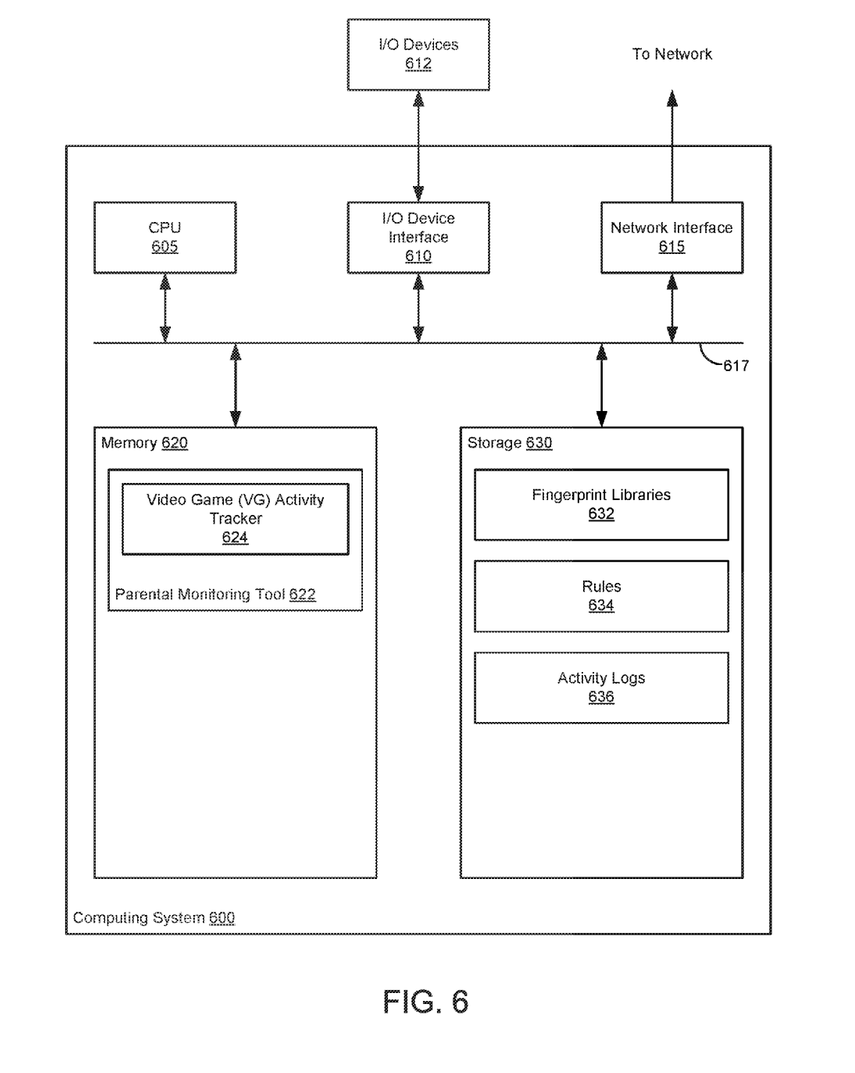
FIG. 6 illustrates an example computing system configured to monitor video game activity, according to one embodiment.

FIG. 6 illustrates a computing system 600 configured to monitor video game activity occurring within a network, according to one embodiment. As shown, computing system 600 includes, without limitation, a central processing unit (CPU) 605, a network interface 615, a memory 620, and storage 630, each interconnected with a bus 617. The computing system 600 may also include an I/O device interface 610 connecting I/O devices 612 (e.g., keyboard, display, mouse devices, etc.) to the computing system 600. Further, in context of the present disclosure, the computing elements shown in the computing system 600 may correspond to a physical computing system (e.g., a system in an enterprise network).

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 a parental monitoring tool 622. And storage 630 includes fingerprint libraries 632, rules 634, and activity logs 636. The parental monitoring tool 622 provides security features for a home network (e.g., by detecting malware in systems, detecting suspicious network activity, and the like). In one embodiment, the parental monitoring tool 622 further includes a video game (VG) activity tracker 624. The VG activity tracker 624 monitors and evaluates usage metrics occurring between a given gaming console device and peripheral devices (e.g., game controllers, keyboards, headsets) connected with the gaming console device through some wireless communication protocol.

In one embodiment, to do so, the VG activity tracker 624 receives wireless network activity from a network device (e.g., a router) within the home network. The VG activity tracker 624 may evaluate the wireless network activity based on fingerprint libraries 632 to determine whether the wireless network activity matches data patterns corresponding to communications between a gaming console device and a peripheral device. For example, the fingerprint libraries 632 may include distinct definitions for a variety of peripheral devices to a particular gaming console device.

Once determined, the VG activity tracker 624 collects usage metrics (e.g., amount of time connected, timestamp information, etc.) associated with the communication. Further, the VG activity tracker 624 may generate alerts to send to the parental monitoring tool 622 in in the event that the collected metrics trigger any user-defined rules 634. Further still, the VG activity tracker 624 may record and store usage metrics and activity in the activity logs 636. The VG activity tracker 624 may publish alerts and activity logs 636 to the parental monitoring tool 622. In turn, the parental monitoring tool 622 may present the alerts and activity log 636 via a user interface.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The following discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    observing one or more wireless communications sent between a gaming console and at least a first peripheral;
    generating one or more usage metrics describing the wireless communications;
    evaluating the wireless communications based on one or more specified rules; and
    upon determining that the usage metrics trigger at least one of the specified rules, generating a notification describing the usage metrics triggering the specified rules.

2. The method of claim 1, wherein the wireless communications sent between the gaming console and the first peripheral are sent via a wireless communication protocol.

3. The method of claim 1, further comprising:
    recording the usage metrics to a log; and
    publishing the log to a user interface of a computer system.

4. The method of claim 1, wherein observing the one or more wireless communications sent between the gaming console and the first peripheral comprises:
    receiving the wireless communications from a network device;
    determining whether the wireless communications match one of a plurality of fingerprint pattern data corresponding to the gaming console and the first peripheral; and
    upon determining that the wireless communications match the fingerprint pattern data, identifying the gaming console.

5. The method of claim 1, further comprising:
observing wireless communications sent between the gaming console and a second peripheral;
generating one or more usage metrics describing the wireless communications sent between the gaming console and the second peripheral; and
evaluating the wireless communications sent between the gaming console and the first peripheral relative to the wireless communications sent between the gaming console and the second peripheral.

6. The method of claim 1, wherein the first peripheral is one of at least a game controller, keyboard, camera, and headset.

7. The method of claim 1, wherein the usage metrics include an amount of time of communication between the gaming console device and the first peripheral and a timestamp indicating a period during which the wireless communications are observed.

8. A non-transitory computer-readable medium storing instructions, which, when executed, perform an operation comprising:
observing one or more wireless communications sent between a gaming console and at least a first peripheral;
generating one or more usage metrics describing the wireless communications;
evaluating the wireless communications based on one or more specified rules; and
upon determining that the usage metrics trigger at least one of the specified rules, generating a notification describing the usage metrics triggering the specified rules.

9. The non-transitory computer-readable medium of claim 8, wherein the wireless communications sent between the gaming console and the first peripheral are sent via a wireless communication protocol.

10. The non-transitory computer-readable medium of claim 8, wherein the operation further comprises:
recording the usage metrics to a log; and
publishing the log to a user interface of a computer system.

11. The non-transitory computer-readable medium of claim 8, wherein observing the one or more wireless communications sent between the gaming console and the first peripheral comprises:
receiving the wireless communications from a network device;
determining whether the wireless communications match one of a plurality of fingerprint pattern data corresponding to the gaming console and the first peripheral; and
upon determining that the wireless communications match the fingerprint pattern data, identifying the gaming console.

12. The non-transitory computer-readable medium of claim 8, wherein the operation further comprises:
observing wireless communications sent between the gaming console and a second peripheral;
generating one or more usage metrics from the wireless communications sent between the gaming console and the second peripheral; and
evaluating the wireless communications sent between the gaming console and the first peripheral relative to the wireless communications sent between the gaming console and the second peripheral.

13. The non-transitory computer-readable medium of claim 8, wherein the first peripheral is one of at least a game controller, keyboard, camera, and headset.

14. The non-transitory computer-readable medium of claim 8, wherein the usage metrics include an amount of time of communication between the gaming console and the first peripheral and a timestamp indicating a period during which the wireless communications are observed.

15. A system comprising:
a processor; and
a memory storing program code, which, when executed on the processor, performs an operation comprising:
observing one or more wireless communications sent between a gaming console and at least a first peripheral;
generating one or more usage metrics describing the wireless communications;
evaluating the wireless communications based on one or more specified rules; and
upon determining that the usage metrics trigger at least one of the specified rules, generating a notification describing the usage metrics triggering the specified rules.

16. The system of claim 15, wherein the wireless communications between the gaming console and first peripheral are sent via a wireless communication protocol.

17. The system of claim 15, wherein observing the one or more wireless communications sent between the gaming console and the first peripheral comprises:
receiving the wireless communications from a network device;
determining whether the wireless communications match one of a plurality of fingerprint pattern data corresponding to the gaming console and the first peripheral; and
upon determining that the wireless communications match the fingerprint pattern data, identifying the gaming console.

18. The system of claim 15, wherein the operation further comprises:
observing wireless communications sent between the gaming console and a second peripheral;
generating one or more usage metrics describing the wireless communications sent between the gaming console and the second peripheral; and
evaluating the wireless communications sent between the gaming console and the first peripheral relative to the wireless communications sent between the gaming console and the second peripheral.

19. The system of claim 15, wherein the first peripheral is one of at least a game controller, keyboard, camera, and headset.

20. The system of claim 15, wherein the usage metrics include an amount of time of communication between the gaming console and the first peripheral and a timestamp indicating a period during which the wireless communications are observed.

* * * * *